(12) United States Patent
Kitchen

(10) Patent No.: US 8,855,556 B2
(45) Date of Patent: Oct. 7, 2014

(54) METHODS AND APPARATUS FOR CONTROLLING STATE AND FUNCTIONALITY OF AN ELECTRONIC COMPONENT THROUGH MOTION-AWARENESS

(75) Inventor: Robert Kitchen, Stroud (GB)

(73) Assignee: Broadcom Corporation, Irvine, CA (US)

( * ) Notice: Subject to any disclaimer, the term of this patent is extended or adjusted under 35 U.S.C. 154(b) by 294 days.

(21) Appl. No.: 13/165,456

(22) Filed: Jun. 21, 2011

(65) Prior Publication Data

US 2012/0302163 A1 Nov. 29, 2012

Related U.S. Application Data

(60) Provisional application No. 61/489,120, filed on May 23, 2011.

(51) Int. Cl.
*H04B 5/00* (2006.01)

(52) U.S. Cl.
CPC .......... *H04B 5/00* (2013.01); *G06F 2200/1637* (2013.01)
USPC ....... 455/41.1; 455/41.2; 455/414.1; 713/300

(58) Field of Classification Search
USPC ............. 455/41.1, 41.2, 414.1, 456.3, 550.1, 455/552.1; 713/300
See application file for complete search history.

(56) References Cited

U.S. PATENT DOCUMENTS

| | | | | |
|---|---|---|---|---|
| 8,219,028 | B1* | 7/2012 | Flamholz | 455/41.2 |
| 2010/0283575 | A1* | 11/2010 | Tubb et al. | 340/5.1 |
| 2011/0227911 | A1* | 9/2011 | Joo et al. | 345/419 |

\* cited by examiner

*Primary Examiner* — Tuan H Nguyen
(74) *Attorney, Agent, or Firm* — Sterne, Kessler, Goldstein & Fox P.L.L.C.

(57) ABSTRACT

Methods and apparatus for operating an electronic component, such as an NEC communication device, allow performance of at least one operation based, at least in part, on the relative positions and/or motions of the electronic component over time. Information regarding motion of the electronic component is used to determine one or more actions, or one or more state changes of the electronic component. Such an electronic component is motion-aware. Since this motion-awareness gives the electronic component the ability to take one or more actions, or to make one or more state changes, based, at least in part, on information indicative of its relative position or motions over time, various states and/or functions of the electronic device may be initiated and/or controlled by subjecting it to one or more movements or motions.

19 Claims, 7 Drawing Sheets

METHODS AND APPARATUS FOR CONTROLLING STATE AND FUNCTIONALITY OF AN ELECTRONIC COMPONENT THROUGH MOTION-AWARENESS

RELATED APPLICATIONS

This nonprovisional application claims the benefit of the earlier filed provisional application entitled "Method And Apparatus For Controlling State And Functionality Of An Electronic Component Through Motion-Awareness", filed May 23, 2011, Application No. 61/489,120, the entirety of which is hereby incorporated by reference.

FIELD OF THE INVENTION

The present invention relates generally to Near Field Communication (NFC) devices and the operation and application thereof. More particularly, the present invention relates to methods and apparatus for controlling an NFC device having motion-awareness.

BACKGROUND

Advances in semiconductor manufacturing technologies have resulted in dramatically increased circuit packing densities and higher speeds of operation. In turn these advances have provided designers with the ability to produce many sensor, processor and communication functions that were not previously practical. In some instances these functions are combined in a single highly integrated device. In other instances these functions are partitioned into two or more devices or chips.

One result of the improvement in semiconductor manufacturing technologies has been the development of MEMS-based accelerometers and gyroscopes. The use of accelerometers, or accelerometers in combination with gyroscopes, to sense motion is known.

Another result of the improvement in semiconductor manufacturing technologies has been the development of Near Field Communication (NFC) circuits, systems and applications. Products incorporating NFC communication capabilities are sometimes referred to in the field as NFC-enabled. For example, mobile phones or handsets that include NFC communication capabilities are referred to as NFC-enabled. NFC communication allows two similarly equipped devices to exchange data with each other over short distances. Although a strict definition for the range of short distances is not agreed upon in the field, short range for NEC usually is thought of as being less than 4 cm, or within one wavelength of the selected communication frequency.

The short range communication capability of NFC-enabled devices makes them well-suited for applications such as making payments by placing the NFC-enabled device in close proximity to an NFC reader device. However, the ease of using these payment features of NFC-enabled devices raises concerns about the security with respect to unauthorized payments and loss of sensitive financial data.

What is needed are methods and apparatus for controlling the functionality and performance of electronic components such as NFC communication devices to improve security with respect to unauthorized payments and loss of sensitive financial data.

BRIEF DESCRIPTIONS OF THE DRAWINGS

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
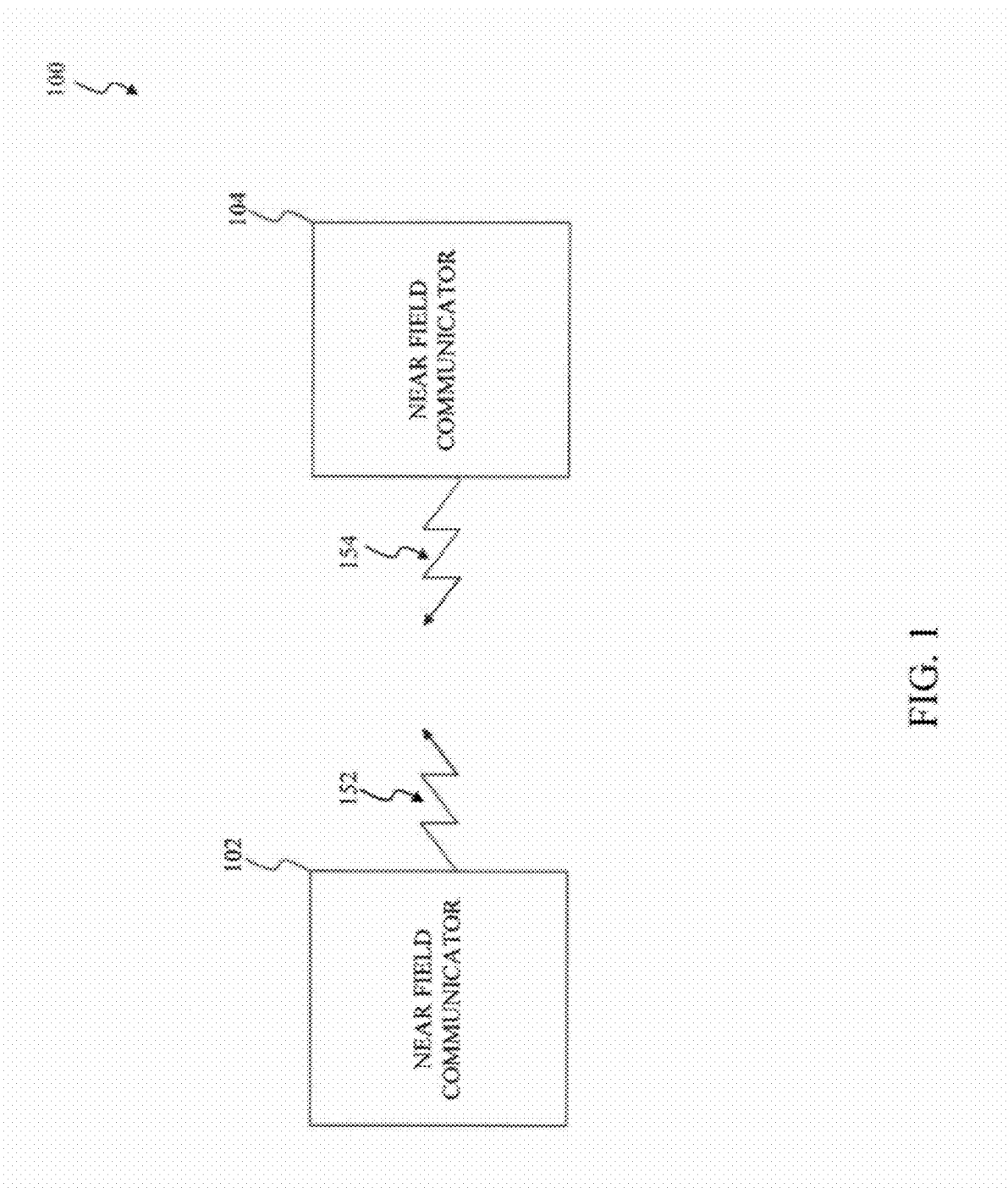
FIG. 1 is a block diagram illustrating a near field communication (NFC) environment in accordance with the present invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description refers to accompanying drawings to illustrate exemplary embodiments consistent with the invention. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

TERMINOLOGY

As used herein, the term "accelerometer" refers to a physical instrumentality that measures acceleration or translational motion. Generally, commercially available accelerometers measure linear acceleration. Such accelerometers are typically implemented as MEMS structures on integrated circuits.

The acronym, "MEMS", refers to microelectromechanical systems.

As used herein, the term "gyroscope" refers to a physical instrumentality that measures the rate of angular rotation. That is, the gyroscope is an angular rate sensor.

It is noted that an "angular accelerometer" measures the rate of change of angular rotation.

The expression "inertial measurement unit" refers to a physical instrumentality that includes both accelerometers and gyroscopes.

The expression "acceleration event" refers to a change in acceleration in one or more axes that together or separately exceed predetermined acceleration threshold values. In other words, insignificant (as defined by the predetermined threshold values) motions to which a motion-aware device is subjected may be ignored.

As used herein, the term "transceiver" refers to circuitry including a transmitter and a receiver such that a transceiver may be used to both transmit and receive information. In various implementations of the present invention, a transceiver may be operable in a half-duplex mode, a full-duplex mode, or both. It is noted that a transceiver may be implemented without any requirement of integration on a single die, and the present invention is not limited to any particular partitioning of transceiver functionality amongst any particular number of components. In typical embodiments, transceivers are formed on a single die.

The terms, chip, die, integrated circuit, semiconductor device, and microelectronic device, are often used interchangeably in the field of electronics. The present invention is applicable to all the above as these terms are generally understood in the field.

With respect to chips, it is common that power, ground, and various signals may be coupled between them and other circuit elements via physical, electrically conductive connections. Such a point of connection may be referred to as an input, output, input/output (I/O), terminal, line, pin, pad, port, interface, or similar variants and combinations. Although connections between and amongst chips are commonly made by way of electrical conductors, those skilled in the art will appreciate that chips and other circuit elements may alternatively be coupled by way of optical, mechanical, magnetic, electrostatic, and electromagnetic interfaces.

The term "smartcard" refers to a physical substrate, such as a credit card sized piece of plastic, having an integrated circuit embedded therein. Typically, smartcards are used for financial transactions or secure access to locked facilities. An active smartcard is one that includes an embedded power supply such as a battery. A passive smartcard is one that requires power to be supplied from an external source. In some instances the external source is an energization field from which the passive smartcard harvests the energy needed to carry out its desired function.

An Illustrative Near Field Communications Environment

FIG. 1 is a block diagram showing an NFC environment in accordance with the present invention. An NFC environment 100 provides wireless communication of information among a first device 102 and a second device 104 that are sufficiently proximate to each other. The information may include one or more commands to be executed by first NFC device 102 and/or second NFC device 104, data from one or more data storage devices that is to be transferred to first NFC device 102 and/or second NFC device 104, or any combination thereof. The data storage devices may include one or more contactless transponders, one or more contactless tags, one or more contactless smartcards, any other machine-readable media that will be apparent to those skilled in the relevant art(s) without departing from the spirit and scope of the invention, or any combination thereof. Other machine-readable media may include non-transitory storage media, such as but not limited to, volatile memory, e.g., random access memory (RAM); non-volatile memory, e.g., read only memory (ROM), flash memory, magnetic disk storage media, and optical storage media. Still other machine readable media may include electrical, optical, acoustical or other forms of propagated signals such as carrier waves, infrared signals, and digital signals to provide some examples.

Overview

In various embodiments of the present invention, information regarding change in position over time is used to determine one or more actions, or one or more states of an electronic component such as, but not limited to, an NFC communication device. In other words, an electronic component (e.g., NFC communication device) in accordance with the present invention is motion-aware. This motion-awareness gives the illustrative NFC communication device the ability to take one or more actions, or to make one or more state changes, based, at least in part, on information indicative of the relative position of the NFC device over time. In this way, various states and/or functions of the NFC communication device may be initiated and/or controlled by subjecting it to one or more movements or motions.

A exemplary list of state changes and functions that are motion-controllable in accordance with the present invention includes, but is not limited to, selectively supplying power to one or more circuits, blocks, sections or portions of an electronic component; selectively removing power from one or more circuits, blocks, sections or portions of an electronic component; selectively enabling or disabling one or more transmitter, receiver, or transceiver functions; changing one or more modulation schemes, changing one or more signal filtering arrangements (e.g., analog pathway of one or more signals, digital signal processing algorithm(s), or both); changing one or more communication data rates; changing one or more communication power levels; selecting one or more antenna connections from a plurality of possible antenna connections; enabling or disabling access to one or more memory locations within the electronic component; enabling or disabling programming of the electronic component; enabling or disabling interaction between the electronic component and a "reader" device; enabling or disabling one or more transaction functions; changing the authorized amount for a financial transaction; and authenticating a user. It is noted that the foregoing list is illustrative and not limiting on the present invention.

The ability to initiate and/or control various states of an electronic component such as an NFC communication device may be referred to by various terms, expressions and phrases. "Motion-actuated", "motion-activated", "motion-controlled", "inertia-controlled", "position-controlled", "acceleration-controlled" and similar terms, expressions and phrases may be used to refer to the methods and systems in accordance with the present invention.

In accordance with the present invention these movements or motions may be detected through one or more signals received from an accelerometer. It is noted that such an accelerometer may be of a single- or multiple-axis type. In typical embodiments, the accelerometer is a MEMS-based accelerometer. Similarly, these movements or motions may be detected through the use of an inertial measurement unit. Inertial measurement units typically include both one or more accelerometers and one or more gyroscopes. It is noted that both accelerometers and gyroscopes are available as highly miniaturized devices on the scale of integrated circuits.

Illustrative Operations of a Motion-Aware NFC Device

Figure 2:
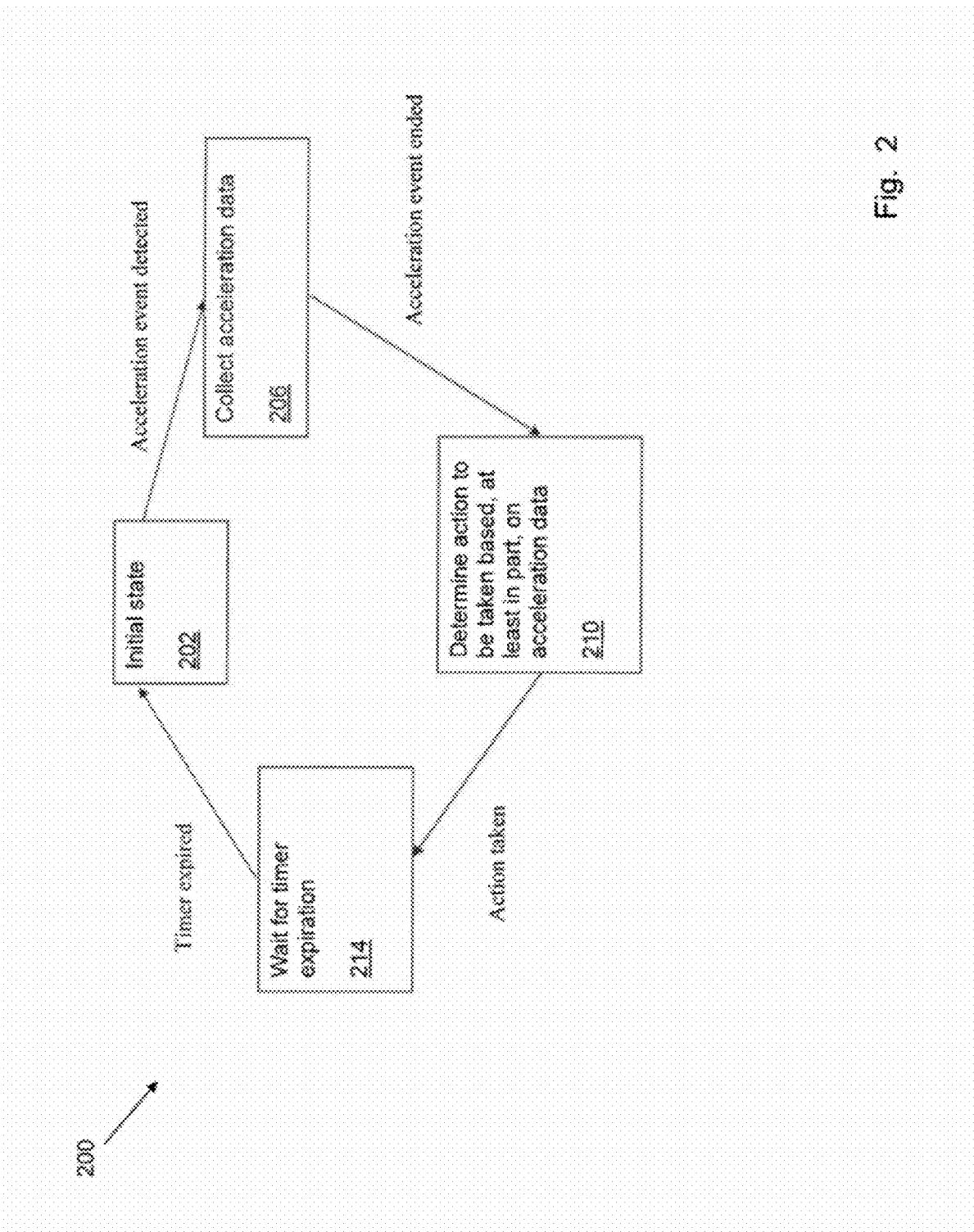
FIG. 2 is a state diagram of an illustrative process in accordance with the present invention.

Referring to FIG. 2, a state diagram of an illustrative process 200 in accordance with the present invention is shown. In an initial state 202 an electronic component, such as, but not limited to an NFC communications device, waits until an acceleration event is detected. Prior to the detection of an acceleration event, the resources of the electronic component that are responsible for determining what motion-based action to take are not required to change state. Subsequent to the detection of an acceleration event, the electronic component transitions to a state 206 in which acceleration data is collected, and in this illustrative embodiment the acceleration data is also analyzed during this time to determine the pattern of the motion. When the acceleration event has ended, the electronic component transitions to a state 210 where a determination is made with respect to one or more actions to be taken based, at least in part on the collected acceleration data. Having determined what actions are to be taken in state 210, the necessary control signals to accomplish, or at least begin the accomplishment, of those actions are generated, and the electronic component then transitions to a state 214. In state 214 a timer is set and, upon the expiration of the timer, the electronic component transitions back to initial state 202. In this illustrative embodiment, while in state 214 the electronic component ignores acceleration events. In this way, "hysteresis" is provided so that there may be a separation between a first motion triggered action a subsequent motion-triggered action.

In various alternative embodiments, the collected acceleration data may be analyzed subsequent to the conclusion of the acceleration event. In alternative embodiments the timer may be set earlier and counted down for a longer period of time.

Figure 3:
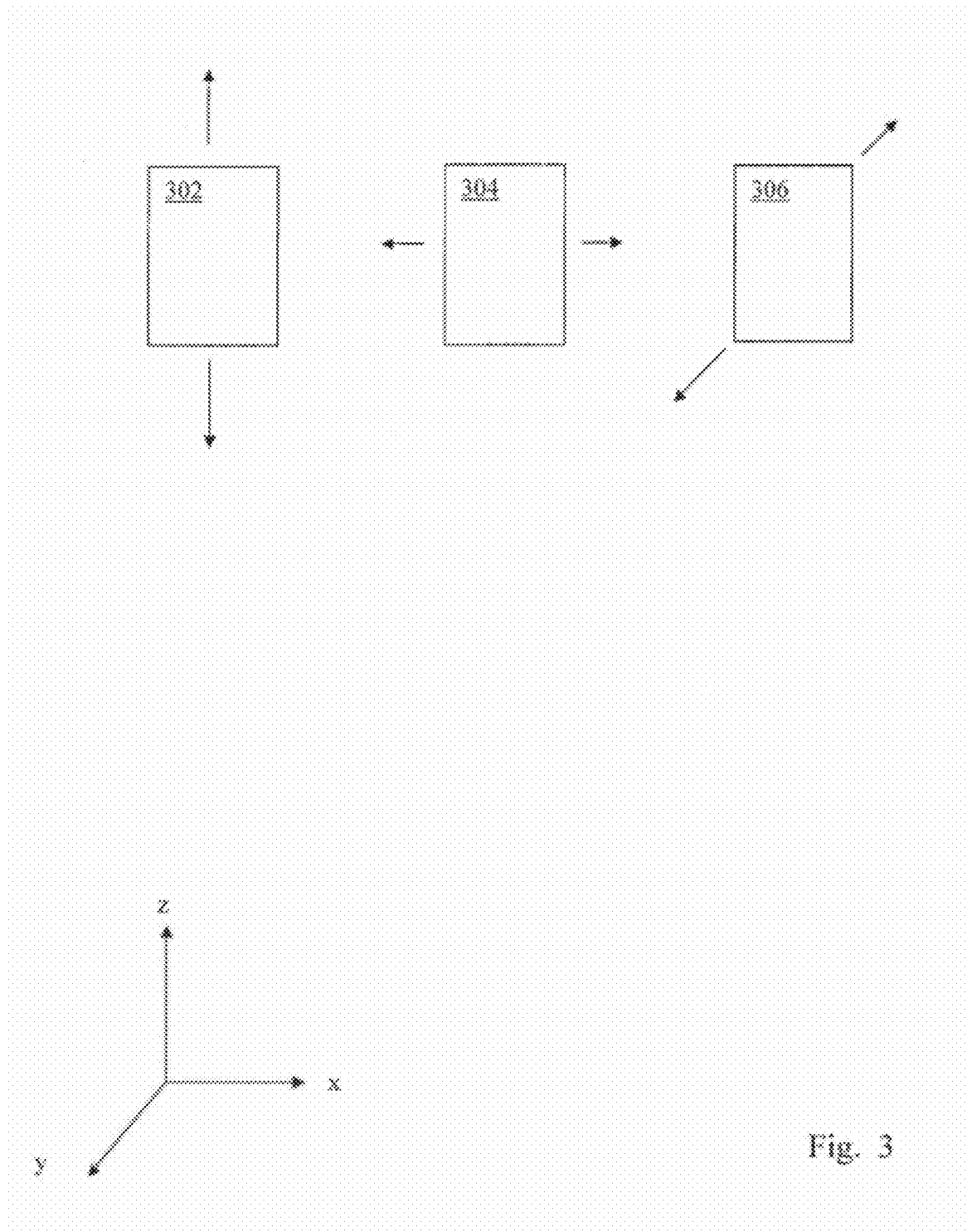
FIG. 3 illustrates three axes (x, y, z) and the directions in which linear acceleration is measured by a three-axis accelerometer.

FIG. 3 shows three axes (x, y, z) and the directions in which linear acceleration is measured by a three-axis accelerometer. In FIG. 3, a first motion-aware electronic component 302 is shown moving in the z-axis; a second motion-aware electronic component 304 is shown moving the x-axis; and a third motion-aware electronic component 306 is shown moving the y-axis. It is noted that while detection of linear acceleration in three axes allows for recognition of complex patterns of motion, the present invention is not limited to detection of a pattern of motion in multiple axes. It is further noted that alternative embodiments of the present invention may measure angular rotation in addition to, or in place of, linear acceleration in the x, y, and/or z directions.

An Illustrative Motion-Aware Electronic Component

Figure 4:
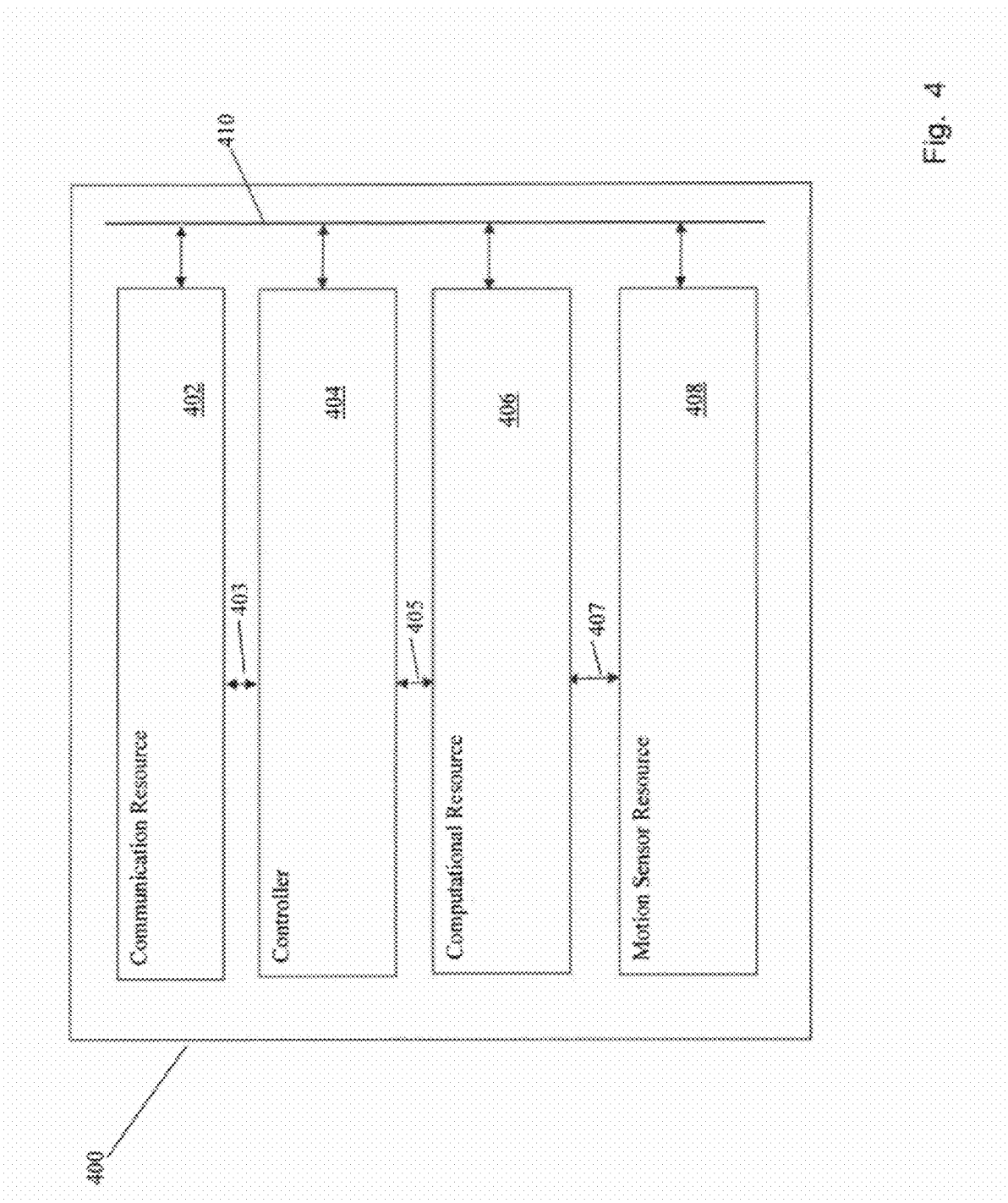
FIG. 4 is a high-level block diagram of an electronic component having a communication resource, a controller, a computational resource, and a motion sensor resource in accordance with the present invention.

FIG. 4 is a high-level block diagram of an illustrative electronic component 400 having a communication resource 402, a controller 404 coupled to communication resource 402 by block-to-block communication path 403, a computational resource 406 coupled to controller 404 by block-to-block communication path 405, and a motion sensor resource 408 coupled to computational resource 406 by block-to-block communication path 407 in accordance with the present invention. FIG. 4 also shows a bus 410 over which blocks 402, 404, 406 and 408 may communicate with each other. It is noted that in some alternative embodiments of the present invention, communication between blocks 402, 404, 406 and 408 may take place exclusively via bus 410, and in other alternative embodiments communication between blocks 402, 404, 406 and 408 may take place via block-to-block communication paths 403, 405, 407. In this illustrative embodiment, communication resource 402, controller 404, computational resource 406, and motion sensor resource 408 are shown as parts of a single electronic component. It is noted that these blocks may be integrated on a single chip, or may be implemented as two or more chips coupled to each other in a single package or enclosure, or may be implemented as two or more chips in separate packages or enclosures wherein the various chips are coupled to each other via the terminals of those packages.

In one illustrative embodiment communication resource 402 provides electronic component 400 with an NFC communication capability; controller 404, responsive to one or more signals from computational resource 406, produces control signals to apply power to, or remove power from, one or more circuits, blocks, sections or portions of electronic component 400.

Still referring to FIG. 4, in typical embodiments, motion sensor resource 408 and communication resource 402 have a fixed spatial relationship to each other, however the present invention is not limited to a fixed spatial relationship between communication resource 402 and motion sensor resource 408.

Illustrative Motion-Aware NFC Communications Devices

Figure 5:
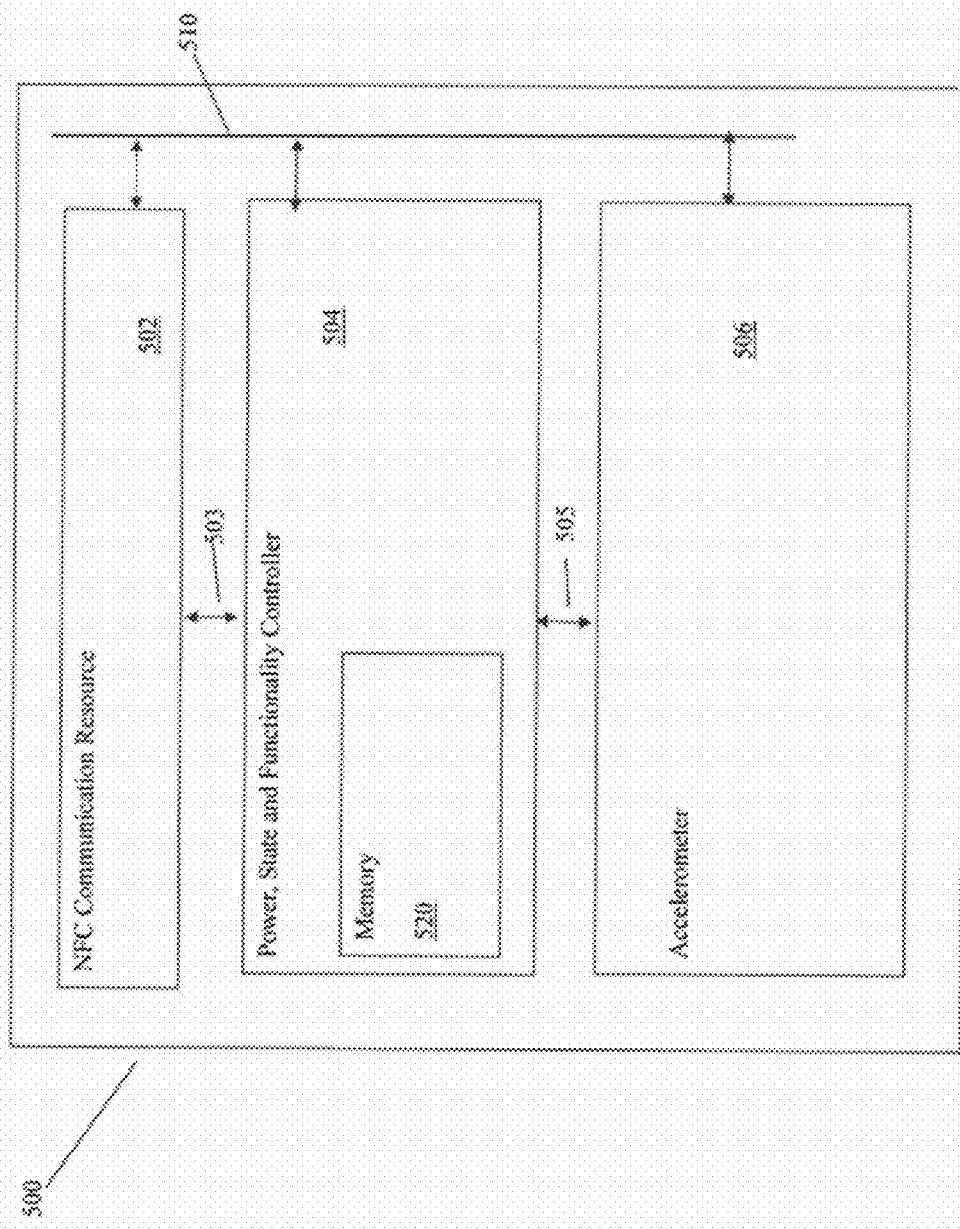
FIG. 5 is a high-level block diagram of an NFC communications device having an NFC communication resource, a power, state and functionality controller, and an accelerometer in accordance with the present invention.

FIG. 5 shows a high-level block diagram of an illustrative NFC communications device 500 having an NFC communication resource 502, a power, state and functionality controller 504, which includes memory 520, coupled to NFC communications resource 502, and an accelerometer 506 coupled to controller 504 in accordance with the present invention. In this illustrative embodiment, NFC communication resource 502 includes both transmit and receive modes of operation, and is in a fixed spatial relationship with accelerometer 506. Controller 504 generates control signals and provides those control signals to NFC communications resource 502 via bloc-to-block communication path 503. Responsive to the control signals, one or more circuits, blocks, portions or functions may be powered-up, powered-down, or otherwise enabled or disabled. By way of example, and not limitation, controller 504 may disable the transmit function of NFC communication resource 502, thereby making NFC communications device 500 into a receive-only device. It is noted that disabling the transmit function may be accomplished by disabling those active elements, typically transistors, that deliver the output transmit power. Alternatively, disabling the transmit function may be accomplished by disabling the modulator of the transmitter. In a still further alternative, the transmit function is disabled by disabling the flow of information to the modulator. Those skilled in the art will recognize various alternative methods and structures for disabling or interrupting the transmit function of an NFC communication resource. It will be appreciated that the receive function of NFC communication resource 502 may be similarly controlled by applying power to, or removing power from, for example, a demodulator in its receive path. In accordance with the present invention, some or all of the control signals generated by controller 504 are based, at least in part, on one or more signals provided by accelerometer 506 over communication path 503. The one or more signals provided by accelerometer 506 are indicative of the motion of NFC communications device 500. In this way, the operation of NFC communications device 500 can be controlled by physically moving device 500.

Still referring to the illustrative embodiment of FIG. 5, access to all of, or portions of, memory 520 may be enabled or disabled by controller 504. In accordance with the present invention, access to memory 520 may be determined based, at least in part, on one or more signals provided by accelerometer 506, which signals are indicative of the motion of NFC communications device 500. In this way, access to memory 520 can be controlled by physically moving NFC communication device 500. Consequently, one or more sections of program code and/or one or more sections of information may be locked, and require a motion-based "trigger" or motion-based "key" in order to unlock and provide access to various sections of program code and/or information stored in memory 520.

In accordance with the present invention, NFC communications device 500 may be used in a wide variety of applications and/or included in a wide variety of product form factors. By way of example and not limitation, NFC communications device 500 may be incorporated in a mobile phone (also referred to as a cellular phone); a smart phone, a smartcard, an identification tag, a security card for keyless entry, and other consumer and industrial applications.

Figure 6:
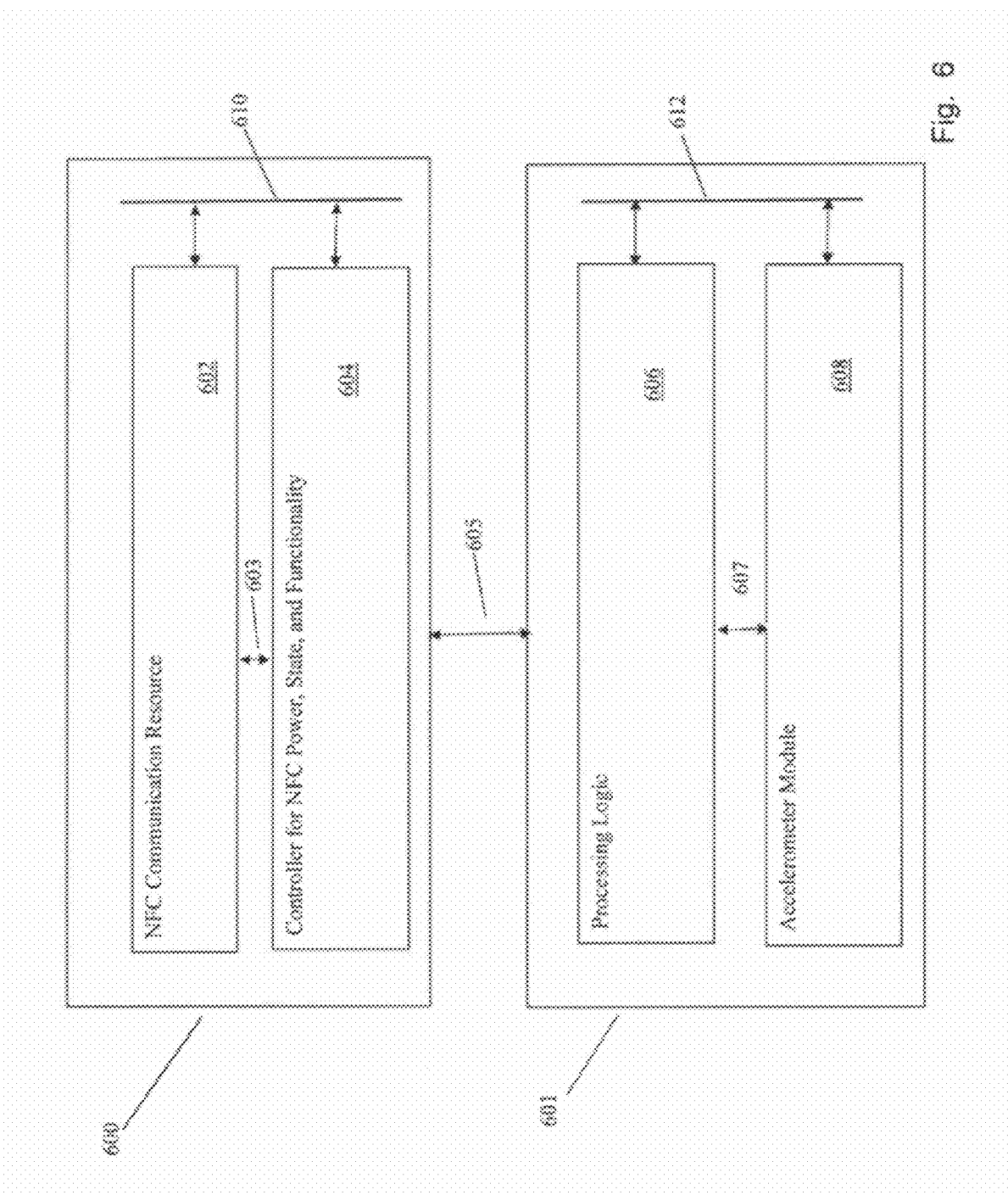
FIG. 6 is a high-level block diagram of an NFC enabled device including an NFC communication resource, and a controller operable to control the power, state, and functionality of the NFC communication resource; and a motion sensor module, coupled to the NFC enabled device, the motion sensor module including processing logic, and an motion accelerometer in accordance with the present invention.

FIG. 6 is a high-level block diagram of an NFC-enabled device 600 including an NFC communication resource 602, and a controller 604 operable to control the power, state, and functionality of NFC communication resource 602; and a motion sensor module 601, coupled to NFC-enabled device 600, motion sensor module 601 including processing logic 606, and an accelerometer module 608 in accordance with the present invention. In this illustrative embodiment, NFC communication resource 602 and controller 604 are coupled by communication path 603 and by bus 610. In alternative embodiments NFC communication resource 602 and controller 604 may be coupled by one or the other rather than both. Also, in the embodiment of FIG. 6, processing logic 606 and accelerometer module 608 are coupled by communication path 607 and by bus 612. In alternative embodiments, processing logic 606 and accelerometer module 608 may be coupled by one or the other rather than both.

Still referring to FIG. 6, NFC-enabled device 600 and motion sensor module 601 are coupled by communication path 605. Communication path 605 may be wired or wireless. In this embodiment, the motion sensor (i.e., accelerometer and processing logic) is physically separated from the NFC-enabled device. That is, NFC-enabled device 600 and motion sensor module 601 are not in a fixed spatial relationship with each other. With this arrangement, motion sensor module 601 may move independently of NFC-enabled device 600. In this way a motion trigger may be provided to the NFC-enabled device without having to move the NFC-enabled device itself. By way of example and not limitation, by mounting the motion sensor in a headset that is coupled to a smart phone, a user may engage in an NFC mediated transaction by placing the smart phone proximate an NFC reader device and provide one or more motion triggers for enabling the NFC communication by moving his or her head.

Illustrative Use of NFC Modem and Accelerometer

Figure 7:
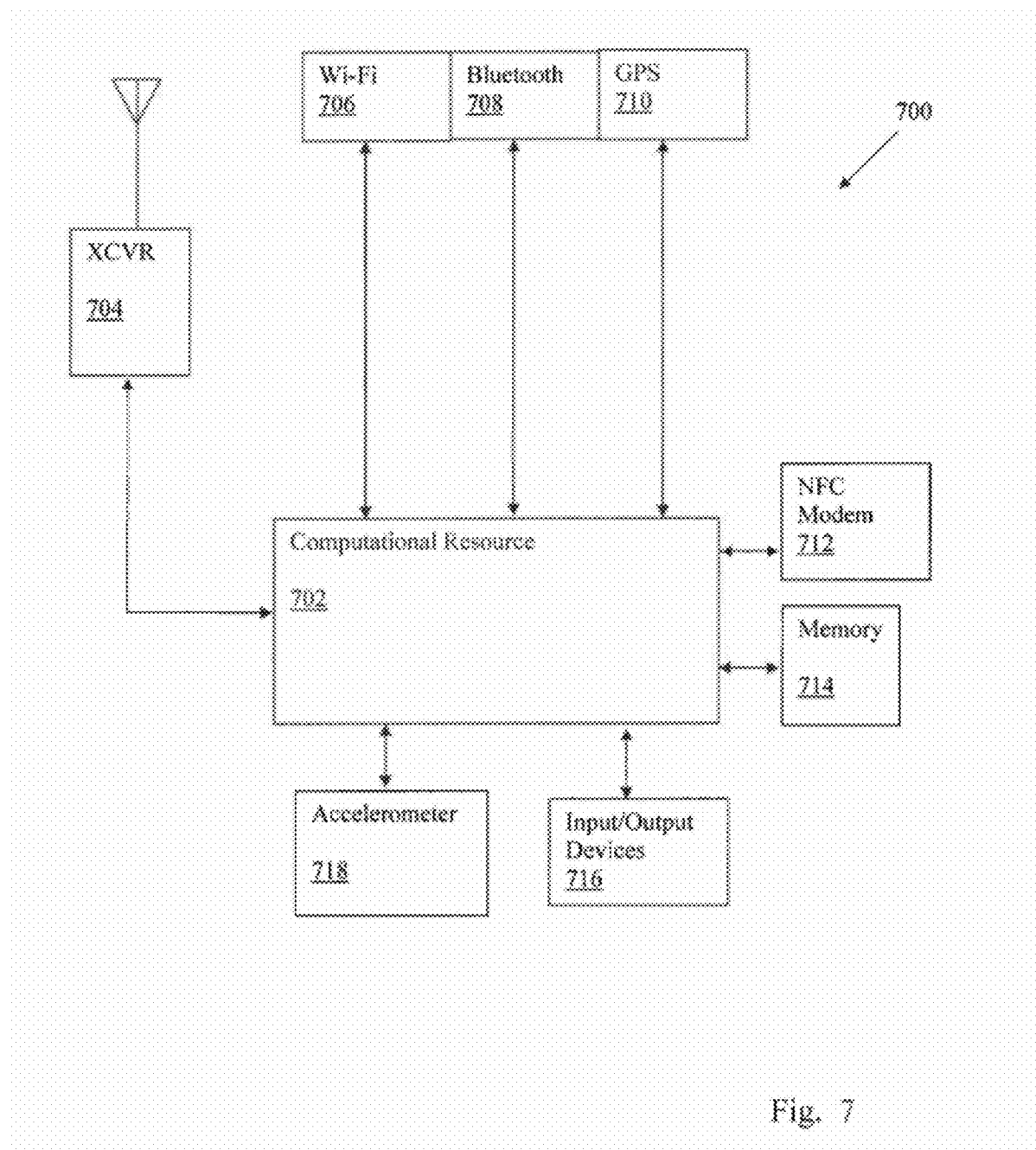
FIG. 7 is a simplified high-level block diagram of an NFC enabled mobile phone.

FIG. 7 shows a simplified high-level block diagram of an NFC-enabled mobile phone 700 in accordance with the present invention. Mobile phone 700 includes a computational resource 702. Those skilled in the art will recognize that computational resource 702 may be implemented in a variety of ways including hardware, program code executed by a processor, or combinations thereof. In the illustrative embodiment, computational resource 702 controls the operation of mobile phone 700 including the performance of any required based band processing (i.e., digital signal processing), the management of the various hardware and software components of mobile phone 700, as well as executing program code associated with "apps", i.e., application programs.

Still referring to FIG. 7, it can be seen that transceiver 704, Wi-Fi block 706, Bluetooth block 710, NFC modem 712, memory 714, Input/Output Devices 716, and accelerometer 718 are all coupled to computational resource 702. Transceiver 704 provides mobile phone 700 with communications between itself and a base station of a service provider. The operation and construction of mobile (or cellular) phone communication circuitry and software is well-known, and is not further described herein. Similarly, the operation and construction of Wi-Fi, Bluetooth and GPS circuitry and software is well-known, as is the inclusion those functions in a mobile phone. NFC modem 712 provides NFC communications capability for mobile phone 700, thereby enabling applications that engage in data transfer over short distances, such as but not limited to, credit transactions, debit transactions, transit fare payments, secure access to buildings, and so on. Input/Output Devices 716 include, but are not limited to, displays, keyboards, microphones, touch screens, cameras, audio outputs, and so on. Accelerometer 718 detects the accelerations to which mobile phone 700 is subjected.

In one embodiment of the present invention, use of NFC modem 712 and accelerometer 718 allows the NFC communication facility of mobile phone 700 to be always off until a predetermined pattern of motion is detected. In this illustrative embodiment, accelerometer 718 provides computational resource 702 the information on the accelerations experienced by mobile phone 700 in each of three orthogonal axes. With this information computational resource 702 determines whether mobile phone 700 has been physically translated through one or more predetermined motions. Based on a recognition of the one or more predetermined motions, computational resource 702 allows NFC modem 712 to be turned on, or otherwise enabled. In this way, the NFC communication facility of NFC-enabled mobile phone 700 is triggered by motion. That is, a predetermined motion acts as a key to unlock the NEC communication facility of mobile phone 700.

In some embodiments, NFC modem 712 is enabled for a predetermined amount of time after the triggering motion is detected. In other embodiments NFC modem 712 is enabled for a predetermined amount of data transfer after the triggering motion is detected. In some embodiments, both the amount of time and the amount of data transferred are monitored to determine when NFC modem 712 should be disabled. In some embodiments the triggering motions are set, or pre-programmed, by the mobile phone manufacturer. In other embodiments, triggering motions are set, or programmed, by a user of mobile phone 700. In still other embodiments, triggering motions are set or programmed by apps that are executed by computation resource 702 of mobile phone 700.

It will be appreciated that the relationship between triggering motions and NFC communication described above in connection with mobile phone 700 can also be implemented in any motion-aware product that includes NFC communication. By way of example, and not limitation, smart cards, tablet computers, industrial equipment and so on can be constructed and/or operated in accordance with the present invention.

In one embodiment of the present invention, a method of operating an electronic component, includes performing at least one operation based, at least in part, on the relative position of the electronic component over time. In some embodiments, the method may further include receiving at the electronic component one or more signals from which the relative position of the electronic component over time may be determined. In some embodiments the one or more signals are provided by an accelerometer.

In various embodiments of the present invention the at least one operation may include one or more of selectively supplying power to at least one section of the electronic component; selectively removing power from at least one section of the electronic component, changing a communication data rate, changing a modulation scheme, adjusting a transmission power level, enabling or disabling one or more logical functions, or transaction capabilities, and various combinations of the aforementioned. The foregoing list is illustrative and is not intended to limit the present invention to any particular set of operations.

Various embodiments of the present invention are useful in maintaining the security of private information that is electronically stored in, or otherwise encoded onto, a smartcard. Information stored on smartcards may be accessed through physical contact with a smartcard reader, or without physical contact between the smartcard and the reader by means of wireless communication. In some instances wireless, i.e., non-contact, communication is achieved through the incorporation of an NFC communication device in the smartcard. It is known that contactless reader devices can be configured as small form factor, portable assemblies, and that such assemblies can be used to read information from smartcards including, but not limited to credit card numbers. Smartcards with NFC communication capability, in accordance with the present invention, require a user to grant access to information stored on the card by moving the card in a predetermined manner. This type of motion-based access granting prevents an unauthorized contactless reader device from extracting information from the smartcard without the knowledge of the authorized user.

In some embodiments, movement along with another parameter (e.g., pin, fingerprint, etc.) could be used for increased security. Also, in this and other embodiments described herein, the movement can be along any axis, any shape, or in any direction (e.g., a figure eight, a star, a cross, a vertical, a horizontal line, etc.). The movement can be in one direction or back and forth (in the vertical or horizontal plane). Further, three dimensional movements are also contemplated. Simply put, any movement of the device can be used to enable features of a device. Still further, different movements can be used to enable different features of a device (e.g., one movement can be used for access to email and another for access to telephone operations of the device). Or, one movement allows power to be provided to the device, while another movement provides access to certain applications.

In one embodiment, a method of transferring information from an active smartcard having contactless communication capability to a contactless reader includes physically moving the smartcard in a predetermined pattern and subsequently moving the smartcard proximate to the contactless reader for contactless exchange of information. The predetermined motion pattern enables the information exchange. Enabling the information exchange can be achieved in a variety of ways, including, but not limited to, supplying and/or removing power to one or more circuits within the smartcard. It will be appreciated that a transmitter, receiver, memory or other functional block can be enabled or disabled in this way. It is noted that the aforementioned contactless communication capability includes, but is not limited to, NFC communication capability.

In one embodiment of the present invention, a motion-aware electronic component, includes a controller, a communications resource coupled to the controller, a computational resource coupled to the controller, and a motion sensor resource coupled to the computational resource, wherein the controller is operable to apply or remove power from one or more portions of the electronic device. In typical embodiments the communication resource is an NFC communication device, and the motion sensor resource includes at least one accelerometer. In some embodiments the motion sensor resource may include at least one gyroscope, and in still other embodiments the motion sensor includes both one or more accelerometers and one or more gyroscopes.

In various embodiments of the motion-aware electronic component in accordance with the present invention, the controller is operable to selectively apply or selectively remove power from one or more portions of the communications resource based, at least in part, on one or more signals provided by the computational resource, the one or more signals indicative of a predetermined pattern of motion through which the motion sensor resource has been physically translated. In other words, selected functional blocks of the electronic component can be turned on and/or off by moving the electronic component in a predetermined manner. Similarly, various functions can be enabled and/or disabled, without necessarily applying or removing power, by moving the electronic component in a predetermined manner. As noted above, the electronic component may be, is not limited to, a smartcard or a mobile phone.

Various embodiments of the present invention may be implemented in hardware, firmware, software, or any combination thereof. Embodiments of the invention may also be implemented as instructions stored on a machine-readable medium, which may be read and executed by one or more computational resources. A machine-readable medium includes any mechanism from which information can be perceived by a machine (e.g., a computing device). Commonly used machine-readable media include, but are not limited to, read only memory (ROM); random access memory (RAM); magnetic disk storage media; optical storage media; and flash memory devices. Such machine-readable media are typically operable to store information and are further operable to provide for the retrieval of information. It is noted that in various embodiments, a computational resource may perceive information from electrical, optical, acoustical or other forms of propagated signals (e.g., carrier waves, infrared signals, digital signals, etc.). Further, firmware, software, routines, and instructions may be described herein as performing certain actions. However, it is noted that such descriptions are merely for convenience and that such actions in fact result from computational resources, computing devices, processors, controllers, or other devices executing the firmware, software, routines, or instructions.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the subjoined claims and their equivalents.

What is claimed is:

1. A method of operating an electronic component, comprising:
   receiving in the electronic component one or more signals from which a relative position of the electronic component over time may be determined;
   determining the relative position of the electronic component over time;
   comparing the relative position of the electronic component over time to one or more predetermined patterns of motion;
   selectively supplying power to at least one section of electronic equipment, if the step of comparing finds a match with one of the one or more predetermined patterns of motion; and
   ignoring signals from which the relative position of the electronic component over time may be determined for a predetermined amount of time after the step of comparing finds a match.

2. The method of claim 1, further comprising selectively removing power from at least one section of the electronic component if the step of comparing, finds a match with one of the one or more predetermined patterns of motion.

3. The method of claim 1, wherein the one or more signals are provided by an accelerometer.

4. The method of claim 1, further comprising:
   defining one or more patterns of motion and associating each of the patterns of motion with at least one operation to be performed by the electronic component upon recognition, by the electronic component, of the electronic component having been subjected to one of the one or more patterns of motion.

5. The method of claim 1, wherein the electronic component is a near-field communication (NFC) device.

6. The method of claim 1, further comprising:
   controlling access to one or more portions of a memory disposed within the electronic component if the step of comparing finds a match with one of the one or more, predetermined patterns of motion.

7. The method of claim 1, wherein the electronic component is a product selected from the group consisting of smartcards, mobile phones and tablet computers.

8. A method of operating a near field communication (NFC) device, comprising:
   changing a power state of the NFC device based, at least in part, on a comparison between at least one predetermined pattern of motion and information indicative of a position history of the NFC device over a predetermined period of time;
   wherein the information indicative of the position history of the NFC device is generated within the NFC device by an accelerometer; and
   ignoring accelerometer output signals for a predetermined amount of time after a match with the at least one predetermined pattern of motion is detected.

9. A method of operating a near field communication (NFC) device, comprising:
   determining a motion history over a predetermined period of time of the NFC device;
   selecting one or more operations, based at least in part on a comparison, in the NFC device, between at least one motion pattern and the motion history of the NFC device over the predetermined period of time;
   ignoring accelerometer output signals for a predetermined amount of time after a match is detected between the at least one motion pattern and the motion history; and
   performing at least one of the selected one or more operations.

10. The method of claim 9, wherein the one or more operations include applying power to at least one portion of the NFC device.

11. The method of claim 9, wherein the one or more operations include removing power from at least one portion of the NFC device.

12. A motion-aware electronic component, comprising:
   a controller;
   a communications resource coupled to the controller;
   a computational resource coupled to the controller; and
   a motion sensor resource coupled to the computational resource and configured to provide information on a motion of the motion-aware electronic component;
   wherein the controller is configured to selectively apply power to, and selectively remove power from one or more portions of the motion-aware electronic component based, at least in part, on a comparison, in the motion-aware electronic device, between the at least one predetermined pattern of motion and the information provided by the motion sensor resource, and further configured to ignore output signals from the motion sensor resource for a predetermined amount of time based on the comparison, in the motion-aware electronic device, between at least one predetermined pattern of motion and the information provided by the motion sensor resource.

13. The motion-aware electronic component of claim 12, wherein the communications resource comprises a near field communication (NFC) device.

14. The motion-aware electronic component of claim 12, wherein the motion sensor resource comprises at least one accelerometer.

15. The motion-aware electronic component of claim 12, wherein the motion sensor resource comprises at least one gyroscope.

16. The motion-aware electronic component of claim 12, wherein the communications resource comprises a near field communication (NFC) device, and the motion sensor resource comprises at least one accelerometer.

17. The motion-aware electronic component of claim 16, wherein the NFC communication device is disposed in a product selected from the group consisting of smartcards, mobile phones and tablet computers.

18. A method of providing near field communication (NFC) in an NFC-enabled smartphone, comprising:
   detecting, by the NFC-enabled smartphone, signals generated by an accelerometer in the NFC-enabled smartphone that define a pattern of motion;

determining, by the NFC-enabled smartphone, whether the detected pattern of motion matches a predetermined pattern of motion;

enabling operation of near field communications if the predetermined pattern of motion matches the detected pattern of motion;

operating an NFC module in the NFC-enabled smartphone to perform a communication operation; and disabling the operation of the NFC module after performing the communications operation.

19. The method of claim 18, further comprising:

ignoring signals generated by the accelerometer for a predetermined period of time if the predetermined pattern of motion matches the detected pattern of motion.

* * * * *

UNITED STATES PATENT AND TRADEMARK OFFICE
CERTIFICATE OF CORRECTION

| | | |
|---|---|---|
| PATENT NO. | : 8,855,556 B2 | Page 1 of 1 |
| APPLICATION NO. | : 13/165456 | |
| DATED | : October 7, 2014 | |
| INVENTOR(S) | : Robert Kitchen | |

It is certified that error appears in the above-identified patent and that said Letters Patent is hereby corrected as shown below:

Title Page, Item (57), Abstract, please replace "NEC" with --NFC--.

In the Claims

Column 11, line 40, please replace "comparing, finds" to --comparing finds--.

Column 12, line 37, please replace "between the at" with --between at--.

Column 12, line 38, please replace "and the information" with --and information--.

Column 12, line 43, please replace "between at" with --between the at--.

Signed and Sealed this
Tenth Day of February, 2015

Michelle K. Lee
*Deputy Director of the United States Patent and Trademark Office*